United States Patent [19]

Mazzolla

[11] 4,076,437
[45] Feb. 28, 1978

[54] POSITIVE CAM LOCK FOR EXTENSION POLE

[75] Inventor: Richard Mazzolla, Bloomfield, N.J.

[73] Assignee: H & G Industries, Inc., Belleville, N.J.

[21] Appl. No.: 774,710

[22] Filed: Mar. 4, 1977

[51] Int. Cl.² ............................................. F16B 2/18
[52] U.S. Cl. .................................. 403/350; 403/109;
403/110; 403/112; 74/531; 248/411
[58] Field of Search ................. 403/343, DIG. 7, 350,
403/351, 352, 184, 109, 110, 112; 74/531;
248/411, 161, 353, 354 C; 135/3 R, 3 C, 4 B, 7.1 R

[56] References Cited

U.S. PATENT DOCUMENTS

| 689,264 | 12/1901 | Whitehouse | 403/350 X |
| 2,432,059 | 12/1947 | Zipser | 403/350 |
| 2,873,129 | 2/1959 | Edmundson | 403/352 |
| 3,259,407 | 7/1966 | Welt | 403/350 |
| 3,419,293 | 12/1968 | Conrad | 403/351 |
| 3,515,418 | 6/1970 | Nielsen | 403/109 |
| 3,897,621 | 8/1975 | Fedrigo | 403/350 X |

Primary Examiner—Wayne L. Shedd
Attorney, Agent, or Firm—Blum, Moscovitz, Friedman & Kaplan

[57] ABSTRACT

A positive cam lock for a pair of telescoping extension poles. The cam support is mounted to the inner pole and carries a coaxially rotatably mounted idler cam and an eccentrically rotatably mounted locking cam. The outer pole has a number of inwardly extending splines which engage corresponding grooves on the locking and idler cams. When the outer pole is rotated, the eccentric cam will rotate and lock the outer pole at a desired axial position with respect to the inner pole while the idler cam prevents misalignment. A key mounted to the locking cam rides in a keyway on the cam support for preventing over-rotation of the locking cam.

5 Claims, 3 Drawing Figures

POSITIVE CAM LOCK FOR EXTENSION POLE

BACKGROUND OF THE INVENTION

This invention relates generally to a positive cam locking device for telescoping extension poles such as those used to extend the reach of painting implements. While such locking devices have been known in the art, such devices have been less then completely satisfactory in that such locking devices may cause misalignment of the poles or slippage if such locking devices are contaminated with paint or other lubricating substances. One such device is illustrated in U.S. Pat. No. 2,432,059 which uses a single eccentrically mounted cam for locking a pair of telescoping tubes.

SUMMARY OF THE INVENTION

Generally speaking, in accordance with the invention, a positive cam lock for extension poles is provided, which prevents misalignment of the poles. The device has a cam support which is mounted to the inner pole. The cam support carries a rotatably mounted idler cam which is concentric with each of the extension poles. The cam support also carries a rotatably mounted locking cam which is rotatable eccentrically with respect to the central longitudinal axes of the inner and outer poles. The outer pole has a number of inwardly extending splines for engaging and rotating both the idler and locking cams. When the poles are adjusted to the desired extension, the rotation of the poles with respect to one another will cause the eccentrically rotatable locking cam to positively lock the poles together by applying a binding pressure to the inner surface of the outer pole. The idler cam prevents misalignment of the poles along their longitudinal axes. A key is provided for one-way locking and for preventing over-rotation.

Accordingly, it is an object of this invention to provide an improved positive cam lock for extension poles that prevents longitudinal misalignment of the poles.

Another object of the invention is to provide an improved positive cam lock for extension poles which prevents slippage even if the cam elements become contaminated with a foreign substance.

A further object of this invention is to provide an improved positive cam lock for extension poles that is simple and relatively inexpensive to assemble and maintain.

Still another object of the invention is to provide an improved positive cam lock for an extension pole which prevents over rotation in the locking direction.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

DESCRIPTION OF THE PREFERRED EMBODIMENTS

Figure 1:
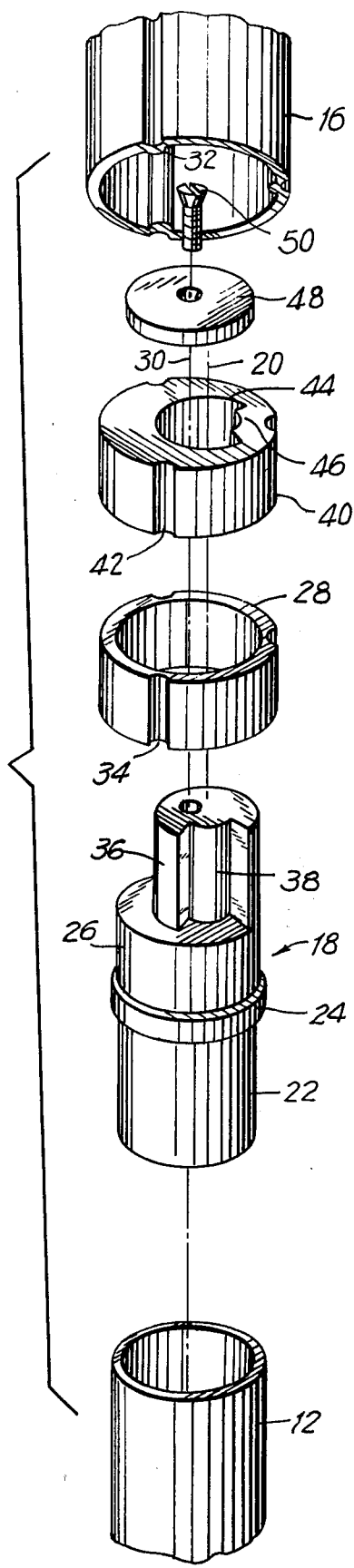
FIG. 1 is an exploded perspective view of a preferred embodiment of the instant invention.
Figure 2:
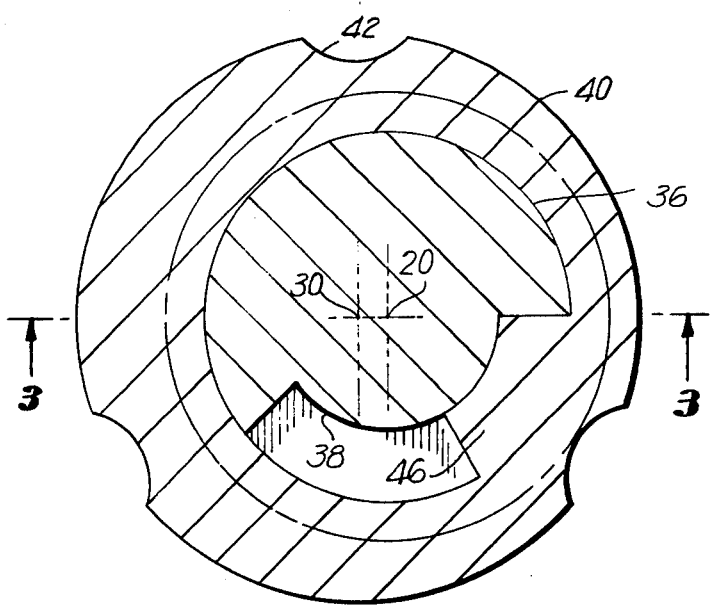
FIG. 2 is a top plan view of the locking cam and cam support of the instant invention, with the top section of the cam support cut away for the sake of clarity.
Figure 3:
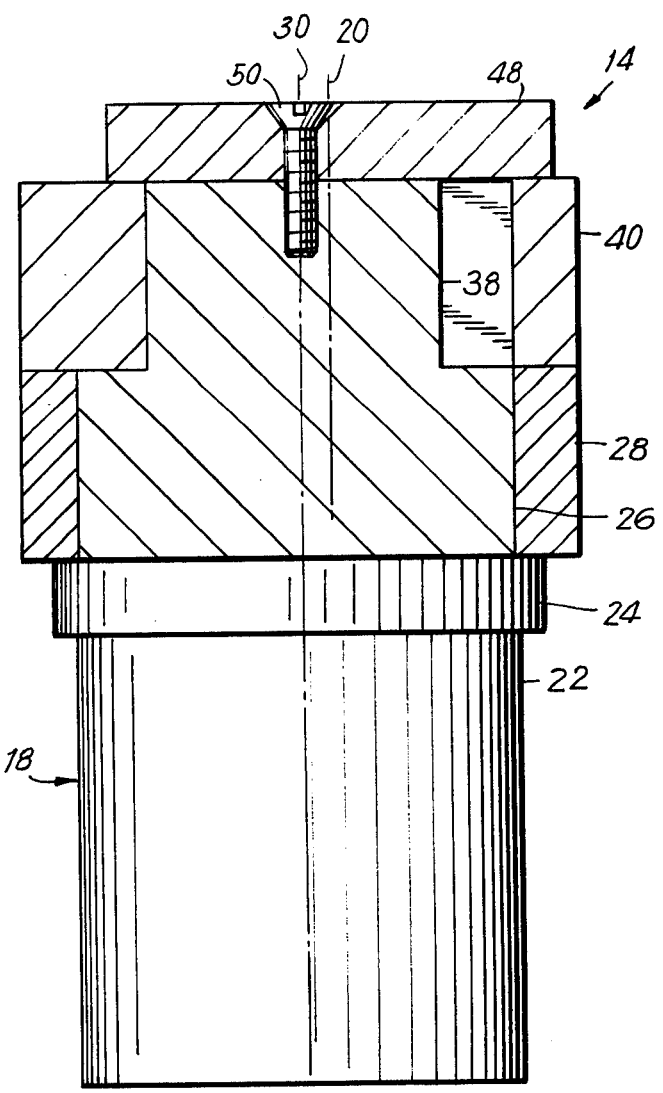
FIG. 3 is a sectional view, taken along line 3—3 of FIG. 2.

Referring now to the drawings, a positive cam lock, indicated generally at 14, is used to lock an inner pole 12, which may be tubular, with respect to an outer tubular or hollow pole 16. Inserted into an open end of pole 12 is a cam support member 18, the lower section 22 of which has an outer diameter corresponding to the inner diameter of pole 12. Lower section 22 of cam support 18 may be fixed to pole 12 by any suitable means such as press fitting, adhesives, staking or the like. A collar 24, located adjacent section 22, serves to limit insertion of cam support 18 into pole 12. A surface of collar 24 bears on the end of pole 12 for this purpose.

Located adjacent collar 24 on cam support 18 is a circular bearing surface 26. Bearing surface 26 is concentric with the longitudinal central axis 30 of poles 12 and 16. Rotatably mounted on bearing surface 26 is an annular idler cam 28, the outer surface of which is slideable along the inner surface of outer pole 16. A series of longitudinally extending and inwardly projecting splines 32 are provided on outer hollow pole 16 corresponding to grooves 34 formed on idler cam 28 for engaging and concentrically rotating idler cam 28. Idler cam 28 is longitudinally located about its lower edge by means of its abutment with collar 24.

Mounted above first bearing surface 26 is a second bearing surface 36 which is of smaller diameter. The axial center line 20 of bearing surface 36 is eccentric from the central longitudinal axis 30 of bearing surface 26 and poles 12 and 16. Bearing surface 36 has a keyway 38 formed on a portion of its periphery. Rotatably mounted upon bearing surface 36 is a locking cam 40 whose outer surface is circular and about the same diameter as idler cam 28 for sliding along the inner surface of outer pole 16. Idler cam 40 is provided with grooves 42 corresponding to splines 32 on outer tube 16. An opening 44 in idler cam 40 corresponds to bearing surface 36 and is centered about axis 20. Thus, at a certain angular position of locking cam 40, its outer surface will be concentric with that of idler cam 28, while at other angular positions, the eccentric mounting of locking cam 40 will cause it to become nonconcentric with idler cam 28. An inwardly extending key 46 rides in keyway 38 of bearing surface 36 for limiting the rotation of locking cam 40 to insure that locking will be effected only by relative rotation of the inner and outer pole in one direction and unlocking will be effected only by relative rotation in the opposite direction. The lower edge of locking cam 40 abuts the upper edge of idler cam 28. A circular upper section 48 of cam support 18 abuts the upper edge of locking cam 40. Upper section 48 is joined to cam support 18 by means of a screw 50 to permit rapid assembly of the cams on their bearing surfaces.

For assembly, locking cam 40 is positioned so that it is concentric with idler cam 28; then idler cam 28 is rotated so that grooves 34 are aligned with grooves 42 of locking cam 40. Positive cam lock 14 may then be inserted into outer pole 16, with splines 32 engaging grooves 42 and 34.

In operation, when the desired extension is set, outer pole 16 is rotated with respect to inner pole 12, causing the rotation of idler cam 28 and locking cam 40. When locking cam 40 is so rotated, its eccentric mounting will cause it to move off center and engage the inner surface of outer pole 16, thus firmly locking inner pole 12 with respect to outer pole 16. The limitation of rotation of locking cam 40 caused by key 46 abutting a terminal edge of keyway 38 will prevent the cam lock mechanism from engaging too tightly for easy removal. This arrangement also provides for one-way locking and prevents jamming which otherwise could occur during attempted unlocking in the wrong direction. The rotation of idler cam 28 prevents misalignment of grooves 42 and 34 and maintains the concentricity of the inner surface of idler cam 28 on bearing surface 26 as required to effect a locking action.

Slippage between the locking cam and outer pole 16 is absolutely prevented by the splines. Jamming or breakage is prevented in the event of attempted unlocking in the wrong direction by key 46.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A positive cam lock for inner and outer telescoping poles which are longitudinally adjustable along a longitudinal axis comprising a cam support mounted to one end of said inner pole, an idler cam mounted on said cam support for concentric rotation with respect to said inner and outer poles, a locking cam rotatably mounted on said cam support, said locking cam being eccentrically mounted with respect to the central longitudinal axis of said inner and outer poles, and positive engagement means acting between said outer pole and said idler cam and locking cam for simultaneous rotation of said idler and locking cams with said outer pole to cause said eccentrically mounted locking cam to engage the inner surface of the outer pole for locking the position of said inner pole with respect to said outer pole.

2. A positive cam lock as claimed in claim 1, wherein said positive engagement means comprises splines extending longitudinally on said outer pole and engaging grooves on said idler and locking cams.

3. A positive cam lock as claimed in claim 1, and further including means acting between said locking cam and said cam support for limiting the rotation of said locking cam.

4. A positive cam lock as claimed in claim 3, wherein said limiting means comprises a key carried by said locking cam and a keyway on said cam support.

5. A positive cam lock as claimed in claim 1, and further including means acting between said locking cam and said cam support for permitting locking acton upon relative rotation of said telescoping poles in a single direction only.

* * * * *